(No Model.)
W. MOORHOUSE.
WASHER FOR PAPER STOCK.
No. 478,066. Patented June 28, 1892.
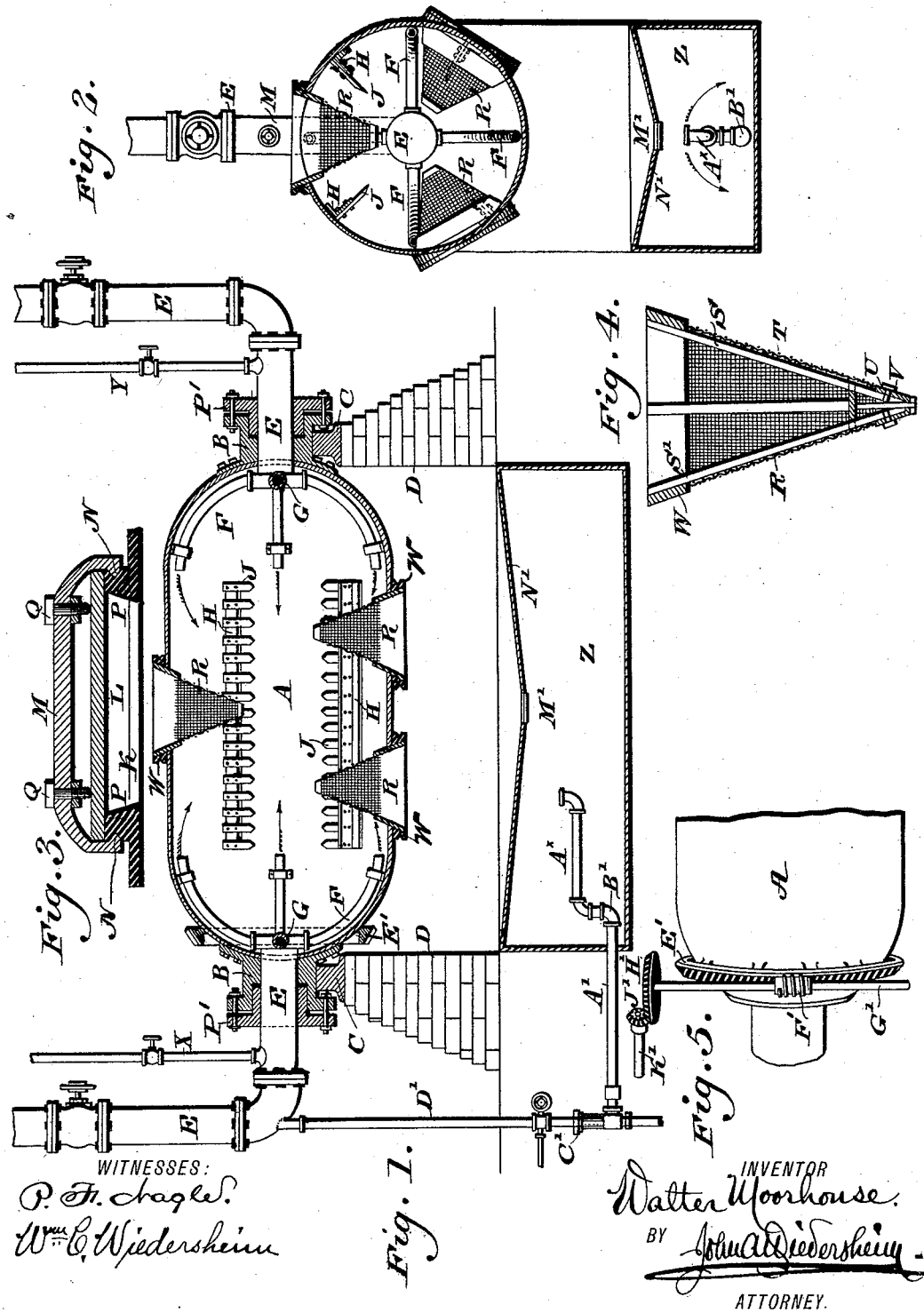
WITNESSES:
INVENTOR
Walter Moorhouse.
BY
ATTORNEY.

UNITED STATES PATENT OFFICE.

WALTER MOORHOUSE, OF PHILADELPHIA, PENNSYLVANIA, ASSIGNOR TO MARGUERITE J. LENHART AND MARGUERITE J. MOORHOUSE, OF SAME PLACE.

WASHER FOR PAPER-STOCK.

SPECIFICATION forming part of Letters Patent No. 478,066, dated June 28, 1892.

Application filed March 26, 1891. Serial No. 386,464. (No model.)

*To all whom it may concern:*

Be it known that I, WALTER MOORHOUSE, a citizen of the United States, residing in the city and county of Philadelphia, State of Pennsylvania, have invented a new and useful Improvement in Washers for Paper-Stock, which improvement is fully set forth in the following specification and accompanying drawings.

My invention relates to improvements in washers for paper-stock; and it consists, first of a rotatable washer having journals at its ends and openings in the sides thereof, and conical hoods or strainers removably fitted in said openings.

It further consists of the combination and arrangement of parts hereinafter described and claimed.

Figure 1 represents a vertical longitudinal section of a device embodying my invention. Fig. 2 represents a vertical section at right angles to that shown in Fig. 1. Fig. 3 represents a longitudinal section of a covering-plate, with securing-cap for the washer-openings, on an enlarged scale. Fig. 4 represents a vertical sectional view, on an enlarged scale, of a detail portion of the device. Fig. 5 represents operative mechanism for rotating the washer.

Similar letters of reference indicate corresponding parts in the several figures.

Referring to the drawings, A designates a washer or digesting receptacle formed of suitable material and having its journals B mounted on the bearings C, the latter being on the walls or supports D. Passing through the journals B and into the washer A are the supply-pipes E for conveying water into the interior of the said washer. Within the said washer at each end thereof is a series of discharge-pipes F, connected to a supply-pipe E by a rotatable sleeve G, so as to be adapted to receive the water from the said supply-pipe and discharge it within the washer. Connected with angle-irons H, which are fastened to the inner wall of the washer, are the teeth J.

The washer A is provided with the openings K in the sides thereof, which are normally closed by the removable plates L, secured in place by means of the sliding bars M, having lips N on their inner lower ends fitting in grooves in the outer flanges P, surrounding the said openings K and the screw-bolts Q, the latter working in said bars and bearing on the plates L, so as to bind them in place on the flanges P. R designates conical hoods or strainers formed with supports S, having a reticulated covering T thereon, the said supports being clamped together at the apex of the hood by means of screw-bolts U and nuts V and around which the reticulated material is placed. The said hoods R are adapted to be inserted in the openings K when the plates L are removed, and are secured therein at their base by fastening them to the side of the washer in any suitable manner, so that they can be readily removed therefrom when so desired. One way of securing them may be by means of bands fastened to said supports S of said hoods and having flanges which may be secured by screws to the washer. For this purpose the hoods are provided with the flanges W, which contact with the outer edge of the wall of the opening, so that they may be connected thereto by any suitable means. Leading into one of the pipes E is a steam-supply pipe X for conveying steam into the washer, and leading into the other supply-pipe is a supply-pipe Y for bleaching material.

Below the washer A is a vat Z, provided with a top N', having inclined sides and an opening therein, and a discharge-pipe A', having an end portion A$^\times$, which is in the vat, formed with a rotatable joint B', whereby the said end portion may be moved to the right or left, as indicated by the arrows, Fig. 2, and thereby adapt its open end to the height of the material in the vat. The pipe A' is connected with a lifting-injector C', having a discharge-pipe D' communicating with one of the pipes E.

To rotate the washer, the following mechanism is employed: To one end of the washer is secured a worm-wheel E', which is engaged by a worm F' on a rotary shaft G', the latter having a bevel-wheel H', which meshes with a bevel-pinion J' on a driving-shaft K', receiving rotary motion from any suitable motor.

The manner of operating the device is as follows: The paper-stock, consisting of old paper or other suitable material, is placed in the washer and saturated with a quantity of alkali from the vat, along with a solution of new alkali passed into the washer through one or more of the openings therein. The plates L being secured above the openings K, the washer is rotated and the steam is passed into the same through the pipes X, E, and F, thereby boiling the stock. After the boiling operation the plates L are removed and the hoods R are placed in position, permitting the alkali to run from the washer into the vat. When the alkali has been discharged from the washer, a valve M' is placed in the opening in the top N' of the said vat, so as to prevent the water which has been directed into the washer through the pipes E and F from entering the vat, the inclined sides of the said top N', forming a gutter, directing the dirty water which has fallen thereon from the washer from off the same.

During the rotation of the washer while the washing is being performed the teeth J raise portions of the pulp out of the dirty water, so that the same is brought directly in contact with the clean water entering the washer. After the pulp has been properly washed the hoods R are removed and the plates L are replaced and a proper amount of bleach is conveyed into the pulp by the pipes V, E, and F. When properly bleached, the pulp is discharged into any suitable receptacle.

When the washer is refilled with stock, the alkali which is held in the vat Z is reconveyed to the washer by means of the pipe A', lifting injector C', pipe D' and E until the stock becomes thoroughly saturated with said alkali, thereby reusing the same. The stock is then boiled and the operation further carried on, as before described.

P' designates stuffing-boxes connected with the journals B, so as to rotate therewith, and closely fitting on the pipes E, so as to form a close joint, preventing the escape of any water, &c., from the washer.

The conical formation of the hoods or strainers R prevent a clogging thereof by the digested stock backing against the same as the fluid flows therethrough by reason of the extended straining-surface which is presented and which projects into the body of the washer.

Having thus described my invention, what I claim as new, and desire to secure by Letters Patent, is—

1. A washer for treating paper-stock, provided with journals at its ends and openings in the sides thereof, and conical hoods or strainers removably fitted in said openings for the purpose set forth, substantially as described.

2. The combination of a rotatable washer having openings in its sides, supply-pipes leading into the said washer through the journals thereof, strainers of reticulated material filling said openings, a vat below said washer, and a pipe leading from the vat and communicating with one of the supply-pipes of the washer, said parts being combined substantially as described.

3. The combination of a rotatable washer provided with openings in its sides, water-supply pipes leading into said washer through the journals thereof, a vat below said washer, a discharge-pipe leading from said vat, and a lifting-injector communicating with said vat-discharge pipe and having a pipe leading into one of the water-supply pipes, substantially as described.

4. A rotatable washer having openings in its sides, reticulated strainers fitted in said openings, water-supply pipes leading into said washer through the journals thereof, a series of pipes secured within the washer and communicating with the supply-pipes, a vat below said washer, a steam-supply pipe leading into one of said water-supply pipes, and a discharge-pipe for said vat, communicating with one of said supply-pipes of the washer, said parts being combined substantially as described.

5. A washer for paper-stock, having openings in its sides and reticulated strainers of conical form removably secured in said openings of the washer, said parts being combined substantially as described.

6. In a device of the character set forth, a vat having a discharge-pipe with a rotatable end portion within said vat, substantially as and for the purpose described.

WALTER MOORHOUSE.

Witnesses:
JOHN A. WIEDERSHEIM,
A. P. JENNINGS.